2,964,455

ELECTRON IRRADIATION OF ORGANIC POLYETHERS

Boynton Graham, Wilmington, Del., assignor to E. I. du Pont de Nemours and Company, Wilmington, Del., a corporation of Delaware No Drawing. Filed Nov. 5, 1956, Ser. No. 620,178

7 Claims. (Cl. 204—154)

This invention is concerned with polyethers of improved pliability and with a process for their preparation by irradiation.

The polyethers include the polymeric vinyl ethers and the polymeric alkylene oxides. The polyvinyl ethers are generally soft and tacky and have found utility as adhesives. They are not, in general, suitable for the manufacture of films, such as can be employed as wrapping materials. Of the polyalkylene oxides, polyethylene oxide is a water-sensitive product that is useful as a humectant, thickener, or softener and is unsuitable for films or molded objects. Some of the higher polyalkylene oxides, such as polytetramethylene oxide, are more rigid and useful in moldings. All of the polyethers are deficient in pliability and rubbery character.

A general object of this invention is, consequently, the provision of improvements in the manufacture of polyethers.

A more specific object is provision of a method for preparing polyethers of improved pliability.

A further object is the provision of polyethers crosslinked to improve some of the physical properties thereof.

The above-mentioned and yet further objects are accomplished in accordance with this invention by a process in which a preformed polyether having recurring chains at least two carbon atoms long and a crystalline melting point above 35° C. is irradiated with accelerated electrons while it is in the non-crystalline (solid to molten) condition, i.e., at a temperature above the crystalline melting point of the polyether composition. This procedure yields a polymer of markedly greater pliability, thermal stability and rubbery character than the original polyether or than that obtainable from the same polyether by irradiation of the latter in crystalline form.

The polyethers suitable for use in this invention are linear organic polyethers with crystalline melting points above 35° C., molecular weights in excess of 1000, and which have a carbon to ether-oxygen ratio of at least 2 to 1 and no more than 10 to 1. The preferred polymers are characterized by the recurring structural unit —($C_nH_{2n}O$)— where $n$ is a plural integer of not more than 10 and usually between 2 and 8. Such polymers are hydrocarbon except for the ether oxygen and are generally initially substantially non-rubbery and non-elastic at ordinary conditions of temperature.

Polymers useful in this invention having a chain of at least two carbons include the polyalkylene oxides with the recurring unit ($CH_2$)$_n$—O— wherein $n$ is a plural integer of up to 4. Examples of these polyethers are polyethylene oxide and polytetramethylene oxide. A further class of hydrocarbon ethers are the polyvinyl ethers which have the unit.

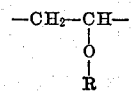

wherein R is a radical, generally hydrocarbon and preferably alkyl, of usually up to 8 carbons. Examples of such ethers are polymers of methyl vinyl ether, isopropyl vinyl ether, and 2-ethylhexyl vinyl ether.

The ethers thus employed are preferably saturated aliphatic hydrocarbon except for the ether oxygen. Particularly preferred are the polyalkylene oxides and of these polytetraethylene oxide undergoes the transformation of this invention readily to yield a modified product of high utility.

The crystalline melting point, i.e, temperature at which the crystalline nature of the polymer is destroyed or the transition temperature of the crystalline to the amorphous state, is readily determined by known methods. It is the temperature at or above which birefringence no longer occurs, and X-ray diffraction patterns indicate an amorphous structure (see, e.g., Weissberger, "Physical Methods in Organic Chemistry," Interscience, 1949, pages 885–6 and 1080–1). For the polymeric ethers of this invention, the crystalline melting point of the solid polymer is at least 35° C. and usually 35–100° C.

Accelerated electrons preferred for the process of this invention are those with an energy of at least 25 kev. when time and cost of radiation are at a minimum and modification in depth is desired. With radiation in this range of energy, rubbery character, increased thermal stability and pliability of the polyether is attained with a minimum length of exposure to the radiation, permitting maximum efficiency in utilization of the radiation. Accelerated electrons with an energy equivalent of 0.5–4 mev. are useful when available at low cost since good penetration is obtained, and bulky objects can be modified throughout. Accelerated electrons for the purposes of this invention can be obtained from any convenient source such as a Van de Graaff generator, a betatron, a cyclotron, an atomic pile, or a radioactive isotope, as is well known to those skilled in the art.

A minimum exposure of at least 1.0 watt-sec./cm.$^2$ at the surface of the polyether is necessary since lower degrees of exposure do not impart the desired pliability and rubbery characteristics thereto. These properties usually increase with increasing degrees of exposure. Upper exposure limits depend on the degree of pliability desired and on the radiation resistance of the polymer. Exposures as high as 1000 to even 15,000 watt-sec./cm.$^2$ can be utilized. The exposure can be carried out in one slow pass or in several faster ones and may be conducted at any convenient amperage.

The temperature of irradiation is generally of the order of 35–125° C. although higher temperatures, e.g., up to 200° C., can be employed.

The minimum temperature for a specific polyether is thus dependent on the conditions whereby it is maintained in an amorphous state. The maximum temperature used is again dependent upon the specific polyether employed. It is below the decomposition temperature of the polymer and preferably below the temperature at which flow or distortion of the polyether object being irradiated takes place. Therefore, for molded objects the temperature of objects being irradiated should be 5–50° C. above the crystalline melting point of the polymer and is preferably 5–25° C. above the crystalline to amorphous transition temperature of the preformed polymer.

The desired temperature can be maintained by conventional means such as in a bath of an inert fluid heat transfer agent, by an oven, hot air source, adjacent hot plate, etc.

Since the polyethers obtained by the process of this invention are not subject to conventional molding or other post-forming techniques, it is preferred that the polymer be fabricated into the shape desired prior to irradiation. The polyethers are therefore not only preformed but preshaped as into a film before irradiation.

The precise nature of the products obtained upon irradiation of the polyethers is unknown. Some crosslinking between chains, however, undoubtedly takes place, the amount depending at least partially on the quantity of irradiation employed.

The products obtained from this invention have improved pliability and rubbery nature. They are also converted to a less fusible as well as a less soluble, if not substantially insoluble, polymer. These properties make them particuarly useful for the preparation of tough elastic films for protective uses such as wrapping films, elastic fibers for garments and industrial fabrics. Pigments, fillers, etc., can be present in relatively small quantities in the polyethers.

In contrast to the good elastic and pliable products obtained from the polyethers, the application of the same process, i.e., irradiation above the crystalline melting point, to other polymers such as nylon, polyvinyl acetate or polytrimethylene adipate does not result in the formation of these properties.

The process of this invention is further illustrated by the following non-limiting examples where in the parts given are by weight.

*Example 1*

This example shows the irradiation of polyethylene oxide.

A 2 mm. thick melt of "Carbowax" 20M (which had a crystalline melting point of 62–64° C. as determined by a polarizing microscope) was preheated at 100° C. for one hour. It was then passed 30 times under the electron beam of a Van de Graaff accelerator operated at 2 mev. and 250 microamperes. The scan width was 20 cm. at the window-to-sample distance of 10 cm. and the pass rate was 2 cm./sec. An interval of about 10 seconds was observed between passes. The total radiation exposure was 375 watt-sec./cm.$^2$. Under the conditions given, the temperature of the molten polyether was maintained at or above 100° C.

The irradiated polymer, when allowed to cool to room temperature, was more translucent and much tougher than it was before irradiation. It was no longer soluble in water. It was much more pliable (flexural modulus = 5832 lbs./sq. in.) than a sample which was similarly irradiated in solid form at room temperature (flexural modulus=20,000 lbs./sq. in.) and still more pliable than a sample which was similarly irradiated in solid form while contained in an ice bath at 0° C. (flexural modulus 31,000–80,000 lbs./sq. in.).

"Carbowax" 20M is the trade name of a polyethylene oxide having a molecular weight of 20,000. It is a water-soluble solid used as a thickener and humectant.

*Example 2*

This example shows the irradiation of polytetramethylene oxide.

A 0.012" thick film of high molecular weight, benzene-soluble polytetramethylene oxide was soaked in water for 20 hours at room temperature. It was then wrapped in 0.007" aluminum foil and irradiated as in Example 1 at an exposure of 250 watt-sec./cm.$^2$. This exposure was obtained during 20 passes with the temperature of the film above its crystalline melting point of 40° C. during the irradiation.

The irradiated material was converted from a stiff film with slow and partial recovery from elongation to a pliable lively rubber no longer soluble in benzene. In contrast, a similar film similarly irradiated except that the film temperature during irradiation was held near 0° C. by an ice bath lost practically all elongation, with little improvement in pliability and no development of rubbery character. These qualities are indicated in the following tabulation.

| Film | Tensile Strength (lbs./sq. in.) | Elongation | | Modulus (lbs./sq. in.) |
| --- | --- | --- | --- | --- |
| | | Total (percent) | Permanent (percent) | |
| Not irradiated | 1,778 | 652 | 150 | 7,275 |
| Irradiated at 0° C | 603 | 45 | about 10 | 6,127 |
| Irradiated above 40° C | 1,708 | 718 | about 10 | 3,061 |

The film irradiated above 40° C. had a zero strength temperature of 155° C., whereas unirradiated film had a zero strength temperature of 55–60° C.

The film irradiated at 0° C. had a zero strength temperature of 140° C. By "zero strength temperature" is meant the temperature at which films broke when loaded at 10 lb./sq. in. and heated in air at a rate of increase of 2° C./min.

Polytetramethylene oxide films prepared by the general procedure noted above were heated for one hour at 100° C. A film irradiated at a temperature of above 40° C. softened but retained its rubbery character. A film which had been irradiated at 0° C. melted to a clear liquid and remained liquid after two days at room temperature.

The polytetramethylene oxide irradiated in the manner described was obtained by the following general procedure: To 3550 parts of purified tetrahydrofuran was added, under nitrogen, 10 parts of solid phosphorus pentafluoride/tetrahydrofuran coordination complex (prepared by saturating tetrahydrofuran with PF$_5$ at 0° C. and subliming the solid at 70° C./0.02 mm.). The mixture of tetrahydrofuran and catalyst was maintained at 30° C. for 6 hours and water added. The polymer was purified by dissolving in tetrahydrofuran and precipitating the polymer by pouring the solution in water.

*Example 3*

A film as in Example 2 was wrapped in 0.0007" aluminum foil, placed on a ⅛" aluminum plate, preheated for 30 minutes at 60° C. and then irradiated as in Example 1. The product was a lively rubber with a reversible elongation of about 600%.

*Example 4*

This example shows the irradiation of polyvinyl isobutyl ether.

A 0.008" film of polyvinyl isobutyl ether (obtained as "high viscosity" PVI–C from General Aniline and Film Corp.) having a crystalline melting point of 102° C. was wrapped in 0.0007" aluminum foil, placed in a ¼" thick aluminum plate, preheated 30 minutes at 110° C., then irradiated at an exposure of 500 watt-sec./cm.$^2$ obtained during 40 passes. The temperature of the system rose to higher than 198° C. during the irradiation. The irradiated film was no longer soluble in benzene. It had a flexural modulus of 42 lbs./sq. in., whereas the flexural modulus before irradiation was 63 lbs./sq. in. The flexural modulus of a film irradiated similarly except that the film temperature during irradiation was held near 0° C. by an ice bath was 79 lbs./sq. in.

The embodiments of the invention in which an exclusive property or privilege is claimed are defined as follows:

1. The process of improving the pliability of an organic polyether which comprises subjecting the same in a semi-solid to molten state to between about 1.0 and 15,000 watt-sec./cm.$^2$ of surface thereof of accelerated electrons at a temperature of about 35–200° C. but above its crystalline melting point, said organic polyether having a crystalline melting point of at least about 35° C., a molecular weight in excess of 1000 and a carbon:ether-oxygen ratio between about 2:1 and 10:1.

2. The invention of claim 1 in which the recurring structural unit is

—($C_nH_{2n}O$)— where $n$ is a plural integer between 2 and 10, inclusive.

3. The invention of claim 1 in which the irradiation temperature is about 5–50° C. above the crystalline melting point of the organic polyether.

4. The invention of claim 3 in which the irradiation temperature is not above about 125° C.

5. The method of improving the physical properties of polyethylene oxide which comprises irradiating the same in a semi-solid to molten state with about 1.0–15,000 watt-sec./cm.$^2$ of surface thereof of accelerated electrons at a temperature above its crystalline melting point and between about 35–200° C.

6. The method of improving the physical properties of polytetramethylene oxide which comprises irradiating the same in a semi-solid to molten state with about 1.0–15,000 watt-sec./cm.$^2$ of surface thereof of accelerated electrons at a temperature above its crystalline melting point and between about 35–200° C.

7. The method of improving the physical properties of polyvinyl isobutyl ether which comprises irradiating the same in a semi-solid to molten state with about 1.0–15,000 watt-sec./cm.$^2$ of surface thereof of accelerated electrons at a temperature above its crystalline melting point and between about 35–200° C.

References Cited in the file of this patent

UNITED STATES PATENTS

| 2,855,517 | Rainer et al. | Oct. 7, 1958 |

FOREIGN PATENTS

| 740,899 | Great Britain | Nov. 23, 1955 |
| 761,051 | Great Britain | Nov. 7, 1956 |
| 665,262 | Great Britain | Jan. 23, 1952 |

OTHER REFERENCES

Little: "Nature," vol. 170, December 20, 1952, pp. 1075 and 1076.

"Ind. & Eng. Chem.," vol. 45, pp. 11A, 13A, September 1953.

Mincher: KAPL–731 "Summary of Available Data on Radiation Damage to Various Non-Metallic Materials," April 2, 1952, pages 3, 4 and 5, declassified February 18, 1955.